No. 819,942. PATENTED MAY 8, 1906.
W. S. H. SMITH.
WHEEL.
APPLICATION FILED NOV. 2, 1905.
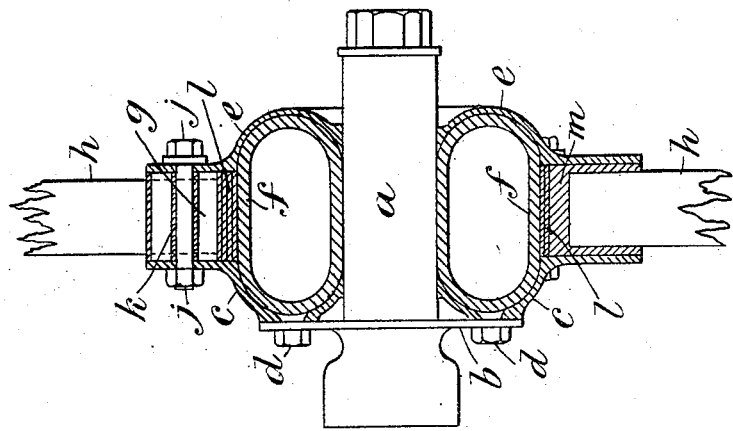
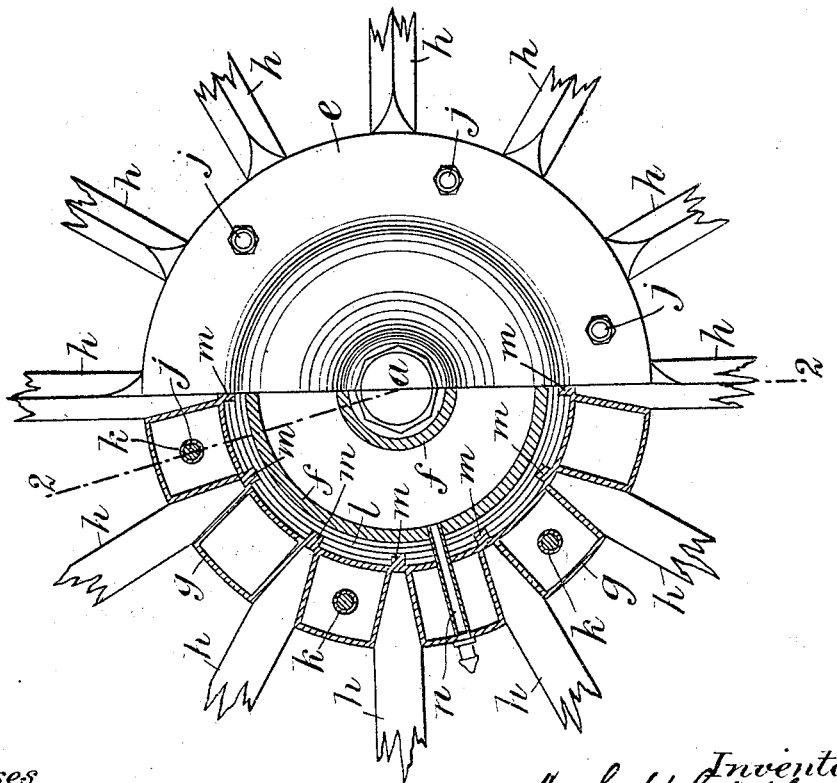

UNITED STATES PATENT OFFICE.

WILLIAM SAMUEL HADGRAFT SMITH, OF CROYDON, ENGLAND.

WHEEL.

No. 819,942.　　　Specification of Letters Patent.　　　Patented May 8, 1906.

Application filed November 2, 1905. Serial No. 285,645.

*To all whom it may concern:*

Be it known that I, WILLIAM SAMUEL HADGRAFT SMITH, engineer, a subject of the King of Great Britain, residing at 212 Whitehorse road, Croydon, Surrey, England, have invented certain new and useful Improvements in or Relating to Wheels for Cycles or Wheeled Vehicles, of which the following is a specification.

This invention relates to pneumatic hubs for vehicles; and its object is to prevent the cutting or wearing of the pneumatic tube and to obtain a more perfect resilient action.

Figure 1 is a half-elevation and half-longitudinal section; and Fig. 2 is a transverse section on the line 2 2, Fig. 1, of a portion of a wheel having a hub constructed according to this invention.

$a$ is the axle-box if the wheel revolves on a fixed axle or the end of the axle itself if the axle revolves in bearings. In this specification it will for brevity be called the "axle."

$b$ is a flange fixed to the axle.

$c$ is a plate which in the construction shown is fixed to the flange $b$ by bolts $d$; but it may be made in one piece with the flange and may be regarded as part of it. $e$ is a plate similar to $c$ and fitting loosely on the axle $a$. It will be observed that the inner face of each of these plates consists of an annular groove of more or less semicircular section surrounding the axle $a$ and an annular plane surface at right angles to the axle.

$f$ is a pneumatic tube of more or less oval section, and $g$ is the nave of the wheel, which in the construction shown consists of a number of square tubes with open ends connected together by five-sided pyramidical boxes which receive the spokes $h$. The plates $c$ and $e$ are connected together by bolts $j$ and distance-tubes $k$, which pass through the square tubes of the nave $g$, so that the nave is free to move freely up and down between the plane surfaces of the plates $c$ and $e$.

$l$ is a band of leather interposed between the pneumatic tube $f$ and the nave $g$. It is prevented from moving relatively to the latter by lugs $m$, which enter into holes in it. Where torsional stresses have to be provided for, the band $l$ is similarly prevented from moving relatively to the tube $f$.

$n$ is the ordinary air-tube for filling the tube $f$.

It will be observed that the pneumatic tube $f$ completely fills the box formed by the axle $a$, the plates $c$ and $e$, and the nave $g$ and that the tube $f$ is of greater width than the nave $g$, which only rests on the central portion of it. It results from this that any weight that there may be on the axle or any shock transmitted from the wheel causes the nave to sink into the air-tube, giving very little lateral distortion and no compression to the material of the air-tube, and that the tube is not liable to be cut by the shear-like action caused by the motion of two adjacent metal parts.

What I claim is—

1. The combination of an axle, two plates on it the inner face of each plate consisting of an annular groove surrounded by a plane surface, a nave free to move between the plane surfaces and a pneumatic tube of more or less oval section with its major axis parallel to the axle and wider than the nave in the space inclosed by the axle, the nave and the grooved part of the plates.

2. The combination of an axle, two plates on it the inner face of each plate consisting of an annular groove surrounded by a plane surface, one plate being fixed to the axle and the other being loose upon it, a nave free to move between the plane surfaces, such nave having tubular openings through it, bolts connecting the two plates together and passing through the tubular openings without touching the nave, and a pneumatic tube of more or less oval section with its major axis parallel to the axle and wider than the nave in the space inclosed by the axle, the nave and the grooved part of the plates.

WILLIAM SAMUEL HADGRAFT SMITH.

Witnesses:
　H. D. JAMESON,
　F. L. RAND.